United States Patent
Liu et al.

(10) Patent No.: US 7,502,360 B2
(45) Date of Patent: Mar. 10, 2009

(54) METHOD AND APPARATUS FOR DYNAMIC NEIGHBOR DISCOVERY WITHIN WIRELESS NETWORKS USING TIME DIVISION MULTIPLE ACCESS (TDMA)

(75) Inventors: Yu-Jih Liu, Ledgewood, NJ (US); Robert Wetstein, Nanuet, NY (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 493 days.

(21) Appl. No.: 11/071,235

(22) Filed: Mar. 4, 2005

(65) Prior Publication Data
US 2006/0198346 A1  Sep. 7, 2006

(51) Int. Cl.
*H04B 7/212* (2006.01)
(52) U.S. Cl. ............................ 370/348; 370/347
(58) Field of Classification Search ............... 370/445, 370/346, 278, 458
See application file for complete search history.

(56) References Cited

U.S. PATENT DOCUMENTS

| | | | |
|---|---|---|---|
| 4,093,153 A | 6/1978 | Bardash et al. | |
| 4,574,378 A | 3/1986 | Kobayashi | |
| 5,206,452 A | 4/1993 | Stamper et al. | |
| 6,331,973 B1 | 12/2001 | Young et al. | |
| 6,469,997 B1 | 10/2002 | Dorenbosch et al. | |
| 6,504,829 B1 | 1/2003 | Young et al. | |
| 6,574,206 B2 | 6/2003 | Young | |
| 6,628,620 B1 | 9/2003 | Cain | |
| 6,768,730 B1 * | 7/2004 | Whitehill | 370/348 |
| 6,859,463 B1 * | 2/2005 | Mayor et al. | 370/445 |
| 6,980,541 B2 * | 12/2005 | Shvodian | 370/346 |
| 7,327,683 B2 * | 2/2008 | Ogier et al. | 370/236 |
| 2001/0045883 A1 | 11/2001 | Holdaway et al. | |
| 2002/0089945 A1 | 7/2002 | Belcea | |
| 2002/0176399 A1 | 11/2002 | Wilmer | |

(Continued)

FOREIGN PATENT DOCUMENTS

EP  1657854 A1  6/2004

(Continued)

OTHER PUBLICATIONS

U.S. Appl. No. 11/071,587, Nerses et al., see claims.*

(Continued)

*Primary Examiner*—Charles N Appiah
*Assistant Examiner*—Joy K Contee
(74) *Attorney, Agent, or Firm*—Edell, Shapiro & Finnan, LLC

(57) ABSTRACT

An Ad-Hoc wireless network according to the present invention employs a TDMA based neighbor discovery protocol, where each network node is assigned a unique time slot to broadcast neighbor discovery packets or messages. A primary controller node is dynamically designated to perform the time slot assignments. A dynamic selection of a secondary or backup controller node is further provided in case of failure of the primary controller node. The present invention further includes flooding techniques based upon TDMA. A TDMA HELLO flood is used to distribute a small number of common parameters to network nodes by placing or piggybacking the information within the neighbor discovery messages. A CNR flood is based on the principles of a RAKE type receiver and used to distribute time slot assignments to the entire network.

53 Claims, 6 Drawing Sheets

U.S. PATENT DOCUMENTS

| | | | |
|---|---|---|---|
| 2002/0191573 | A1 | 12/2002 | Whitehill et al. |
| 2002/0194384 | A1 | 12/2002 | Habetha |
| 2003/0033394 | A1 | 2/2003 | Stine |
| 2003/0120809 | A1 | 6/2003 | Bullur et al. |
| 2003/0125066 | A1 | 7/2003 | Habetha |
| 2003/0142645 | A1 | 7/2003 | Balcea |
| 2003/0179742 | A1 | 9/2003 | Ogier et al. |
| 2003/0202465 | A1 | 10/2003 | Cain |
| 2003/0231584 | A1 | 12/2003 | Zeitfuss |
| 2004/0003111 | A1 | 1/2004 | Maeda et al. |
| 2004/0018839 | A1 | 1/2004 | Andric et al. |
| 2004/0028018 | A1 | 2/2004 | Can |
| 2004/0029553 | A1 | 2/2004 | Cain |
| 2004/0032487 | A1 | 2/2004 | Cain |
| 2004/0042417 | A1 | 3/2004 | Kennedy |
| 2004/0152420 | A1* | 8/2004 | Redi et al. ............... 455/67.11 |
| 2005/0050221 | A1* | 3/2005 | Tasman et al. .............. 709/232 |

FOREIGN PATENT DOCUMENTS

| | | |
|---|---|---|
| GB | 2371450 A | 7/2002 |
| WO | WO 03/021885 | 3/2003 |
| WO | WO 03/073775 | 9/2003 |
| WO | WO 03/088587 | 10/2003 |
| WO | 2005018161 A1 | 2/2005 |

OTHER PUBLICATIONS

J.Moy, "OSPF Version 2," RFC 1583, Mar. 1994.

Charles Perkins, "Ad Hoc on Demand Distance Vector (AODV) Routing," Internet draft, Nov. 20, 1997.

Wei Peng, et al., "On the reduction of broadcast redundancy in mobile and Ad Hoc Networks," MobiHoc 2000, Sigmobile, Aug. 2000, pp. 129-130.

Marc R. Pearlman, et al., "Using multi-hop acknowledgements to discover and reliably communicate over unidirectional links in Ad Hoc networks," IEEE, 2000, pp. 532-536

Marc Mosko, et al., "A self-correcting neighbor protocol for mobile ad-hoc wirless networks," IEEE, 2002, pp. 556-560.

Sunlin, R.C., "A Hybrid Distributed Slot Assignment TDMA Channel Access Protocol", Military Communications Conference, 1990, MILCOM '90, Conference Record, 'A New Era'. 1990 IEEE, vol. 3, pp. 934-938, Sep. 30-Oct. 3, 1990.

Sharp, B.A. et al., "Hybrid TDMA/CSMA Protocol for Self Managing Packet Radio Networks", Universal Personal Communications, 1995, Record, 1995 Fourth IEEE International Conference on, pp. 929-933, Nov. 6-10, 1995.

Papavassiliou, S. et al., "Performance Evaluation Framework and Quality of Service Issues for Mobile Ad Hoc Networks in the Mosaic ATD", MILCOM 2000, 21st Century Military Communications Conference Proceedings, vol. 1, pp. 297-303, Oct. 22-25, 2000.

Fontana, R. et al., "Recent Advances in Ultra Wideband Communications Systems", IEEE Conference on Ultra Wideband Systems and Technologies, 2002 Digest of Papers, pp. 129-133, May 21-23, 2002.

Ramanathan, R. et al., "Hierarchically-Organized, Multihop Mobile Wireless Networks for Quality-of-Service Support", Mobile Networks and Applications 3, 1998.

System Requirements Specification for the SUO SAS Networking Subsystem, Feb 13, 2002.

Tony Ballardie, et al.; "Core Based Trees (CBT)" An Architecture for Scalable Inter-Domain Multicast Routing; pp. 85-95, 1993.

Mario Gerla, et al.; "Multicluster, mobile, multimedia radio network", Wireless Networks (1995) pp. 255-265, 1995.

* cited by examiner

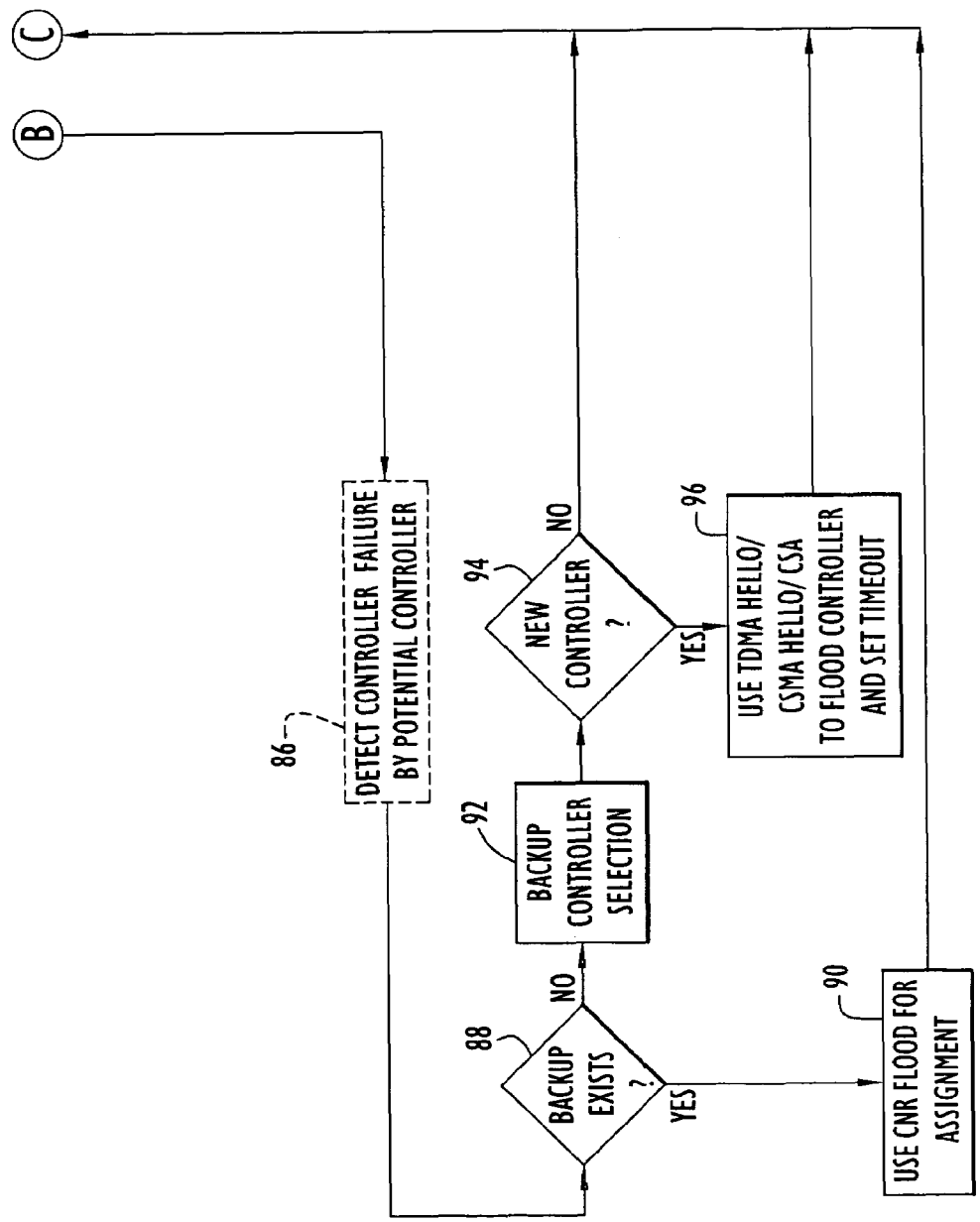

METHOD AND APPARATUS FOR DYNAMIC NEIGHBOR DISCOVERY WITHIN WIRELESS NETWORKS USING TIME DIVISION MULTIPLE ACCESS (TDMA)

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided by the terms of Contract No. DAAB07-03-9-K601 awarded by CECOM.

BACKGROUND OF THE INVENTION

1. Technical Field

The present invention pertains to wireless networks employing neighbor discovery protocols. In particular, the present invention pertains to multi-hop wireless Ad-Hoc networks employing neighbor discovery with each node being assigned a unique time slot to broadcast neighbor discovery (e.g., HELLO) messages.

2. Discussion of the Related Art

Neighbor discovery is essential in every wireless Ad-Hoc communication network. A network node has to announce its existence before network communications are able to commence. In an Ad-Hoc network, the neighbor topology information is exchanged locally. This allows a node to determine node location and adjacency within the network for routing. The neighbor discovery protocol further tracks a lost or new neighbor to enable a timely update of the internal routing tables. The most commonly used neighbor discovery algorithm is periodic-operation-based. In this approach, a node periodically exchanges neighbor discovery (e.g., HELLO) packets or messages with neighboring nodes. The neighbor discovery message is broadcast in a Carrier Sense Multiple Access (CSMA) protocol, where Carrier Sense Multiple Access/Collision Avoidance (CSMA/CA) is a commonly used media access technique for Ad-Hoc wireless networks. The broadcast message includes the neighbors known to the transmitting node (e.g., the nodes from which the transmitting node has received a communication). When a receiving node is present within a neighboring node listing of a received neighbor discovery message, a two-way communication has been established between the receiving and transmitting nodes.

Recently, there have been some attempts to enhance the periodic-operation-based algorithm. For example, a neighbor exchange protocol (NXP) has network nodes send HELLO packets only if no other packets have been sent within a timeout period. Further, multi-hop relaying using a combination of broadcast and unicast has been employed to enhance unidirectional links.

The neighbor discovery protocols discussed above suffer from several disadvantages. In particular, the protocol deficiencies relate to reliability, overhead, update speed and latency for detecting new and lost neighbors. Reliability pertains to the degree of reliability in which neighboring nodes can receive HELLO messages and update speed determines the time in which a missing neighbor can be detected. Update speed relates to the length of the HELLO time interval or period or, in other words, the frequency of HELLO message transmissions. These two parameters are generally conflicting because fast or high frequency transmissions of HELLO packets will increase the traffic load, thereby causing collisions which decrease reliability.

In an Ad-Hoc network, the network nodes compete for a limited number of channels. The CSMA/CA protocol is typically employed to reduce the probability of multiple nodes accessing the channels at the same time. If simultaneous channel access occurs, collisions are unavoidable and HELLO packets are lost. The probability of collisions increases with the rate or frequency of HELLO packet transmissions. If each network node is stationary, the HELLO time interval or period can be long without degrading network performance. However, in a mobile environment (e.g., military battlefield, etc.), nodes move or travel constantly. A node may acquire a new neighbor or lose an existing neighbor. If the nodes move at a fast rate, the frequency of HELLO packets must be increased in order to track the changing neighbors. However, this situation increases the number of collisions and overhead, thereby significantly reducing reliability and diverting bandwidth from user data transmissions. In fact, in a very volatile network, a majority of the bandwidth may be utilized to transmit HELLO packets, thereby compromising the usefulness of the network.

Further, uncertainty exists with respect to detection of a missing, or lost, neighboring node. Generally, several HELLO time intervals or periods are required to expire before a neighbor can be designated as lost. However, if the number of expired HELLO periods is set to an excessive threshold, a lost neighbor cannot be detected in a timely manner. Conversely, valid neighbors may be discarded in response to assigning an insufficient number of HELLO periods as the threshold.

With respect to overhead, the HELLO message transmitted using CSMA/CA requires a reservation. Accordingly, four packets (e.g., Request-to-Send (RTS), Clear-to-Send (CTS), message, and Acknowledgment (ACK)) are transmitted for every data packet transmission, pursuant to conventional standard IEEE802.11. An RTS packet is transmitted from the source node to reserve a channel. A CTS packet is transmitted from the destination node to confirm the reservation, while an ACK packet is transmitted from the destination node to confirm receipt of a data packet. In other words, each HELLO packet is accompanied by three additional overhead packets. In terms of the total number of packets exchanged, the overhead is seventy-five percent (75%).

OBJECTS AND SUMMARY OF THE INVENTION

Accordingly, it is an object of the present invention to employ a neighbor discovery protocol, within wireless Ad-Hoc networks, that utilizes Time Division Multiple Access (TDMA) to avoid collisions and enhance reliability.

It is another object of the present invention to employ a TDMA based neighbor discovery protocol, within wireless Ad-Hoc networks, that dynamically selects a primary controller to assign TDMA time slots to network nodes.

Yet another object of the present invention is to employ a TDMA based neighbor discovery protocol that dynamically selects a secondary controller in case of failure of the primary controller.

Still another object of the present invention is to employ a flooding technique, within a TDMA based neighbor discovery protocol, to distribute a modest quantity of common parameters to network nodes by placing the information within neighbor discovery (e.g., HELLO) messages.

A further object of the present invention is to employ a flooding technique utilizing the principles of a RAKE type receiver.

Yet another object of the present invention is to employ a TDMA based neighbor discovery protocol, within wireless Ad-Hoc networks, that easily detects new and lost network nodes.

The aforesaid objects may be achieved individually and/or in combination, and it is not intended that the present invention be construed as requiring two or more of the objects to be combined unless expressly required by the claims attached hereto.

According to the present invention, an Ad-Hoc wireless network employs a TDMA based neighbor discovery protocol, where each network node is assigned a unique time slot to broadcast neighbor discovery (e.g., HELLO) packets or messages. A primary controller node is dynamically designated to perform the time slot assignments, so that the protocol can accommodate variations in the number of network nodes. Since the time slot assignments are unique, transmission of the neighbor discovery messages occurs without collisions. A dynamic selection of a secondary, or backup, controller node is further provided in case of failure of the primary controller node. The present invention further includes flooding techniques based upon TDMA. A TDMA HELLO flood is used to distribute a small number of common parameters to network nodes by placing or piggybacking the information within the neighbor discovery messages. A Combat Net Radio (CNR) flood is based on the principles of a RAKE type receiver and used to distribute time slot assignments to the entire network.

The present invention provides several advantages. In particular, the present invention employs a TDMA channel access approach, as well as dynamic selection of a controller node that assigns TDMA time slots to each node in the network. A neighbor discovery message is transmitted by each node in its assigned slot. Thus, the lack of reception of a neighbor discovery (e.g., HELLO) packet within a specific time slot immediately indicates a given node being lost. Conversely, new reception of a neighbor discovery message within a time slot immediately indicates a new neighboring node. Further, since only a single node is allowed to transmit in a given time slot, transmission of the neighbor discovery packets occurs without collisions, thereby providing enhanced reliability.

In the conventional CSMA approach, the HELLO time interval, or period, is reduced in response to rapid topology changes, while overhead increases proportionally. However, the TDMA based approach of the present invention provides fixed overhead that is independent of node movement. As long as a sufficient amount of time slots are allocated for the number of nodes that are transmitting neighbor discovery (e.g., HELLO) packets, network overhead, due to Hello packets, will not be affected by network volatility.

With respect to the CSMA/CA protocol, four packets are required for each HELLO message transmission as described above. The present invention TDMA based protocol transmits the neighbor discovery (e.g., HELLO) packet, thereby yielding, in terms of packet quantity, a seventy-five percent (75%) packet reduction.

Time slots may be assigned to network nodes via a fixed or dynamic assignment. In the fixed assignment, time slots are assigned prior to network setup. This assignment process increases the work load of the network administrator. In addition, since the slot assignments are fixed, this approach cannot easily adapt to a changing environment, such as network node additions or node removals.

With respect to the dynamic time slot assignment, a time slot is assigned, or removed, when a node joins, or leaves, the network. The administration of the time-slot assignment scheme may be distributive or central. In the distributive approach, each node may assign itself a time slot. However, the nodes are required to have good coordination in order to prevent duplicate or empty time slot assignments, and this is nearly impossible to ensure in a volatile, Ad Hoc network. Accordingly, the present invention employs a central approach, wherein a TDMA controller (e.g., dedicated central node) is responsible for the time slot assignments. Since the TDMA controller has complete knowledge of all the time slot assignments in the entire network, unique time slots are assigned to the nodes. A secondary or backup controller is further designated to prevent single-point failure and enable continued management of time slot assignments without any interruptions, should the primary controller become disabled.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIGS. 3A-3C are exemplary state diagrams illustrating the manner in which network nodes discover neighboring nodes according to the present invention.

DETAILED DESCRIPTION OF THE PREFERRED EMBODIMENTS

The present invention may be applied to various types of networks (e.g., missile, core based tree (CBT), cluster based networks, etc.) to discover neighboring nodes based on TDMA techniques. A controller network node performs TDMA time slot assignments for conducting neighbor discovery as described below. By way of example only, the present invention may be applied to a missile network including missile manager nodes (MMA), loitering attack missile units (LAM) (e.g., slow moving missile units with long flight time), precision attack missile units (PAM) (e.g., fast moving missile units with short flight time), container launch units (CLU) to launch missile units, unmanned aerial vehicle units (UAV) (e.g., dedicated relays for application support) and ground gateway units (GWY) to connect the missile network to a ground network. The network typically includes several missile managers, each controlling a quantity of missile units. The candidates for designation as a TDMA controller node within the missile network include the missile managers, unmanned aerial vehicle units and ground gateway units, preferably in that order. With respect to other types of networks, the core and back-up core nodes of a CBT network are candidates for designation as a TDMA controller node, while cluster head nodes within a cluster based network are candidates for TDMA controllers for that type of network.

Figure 1:
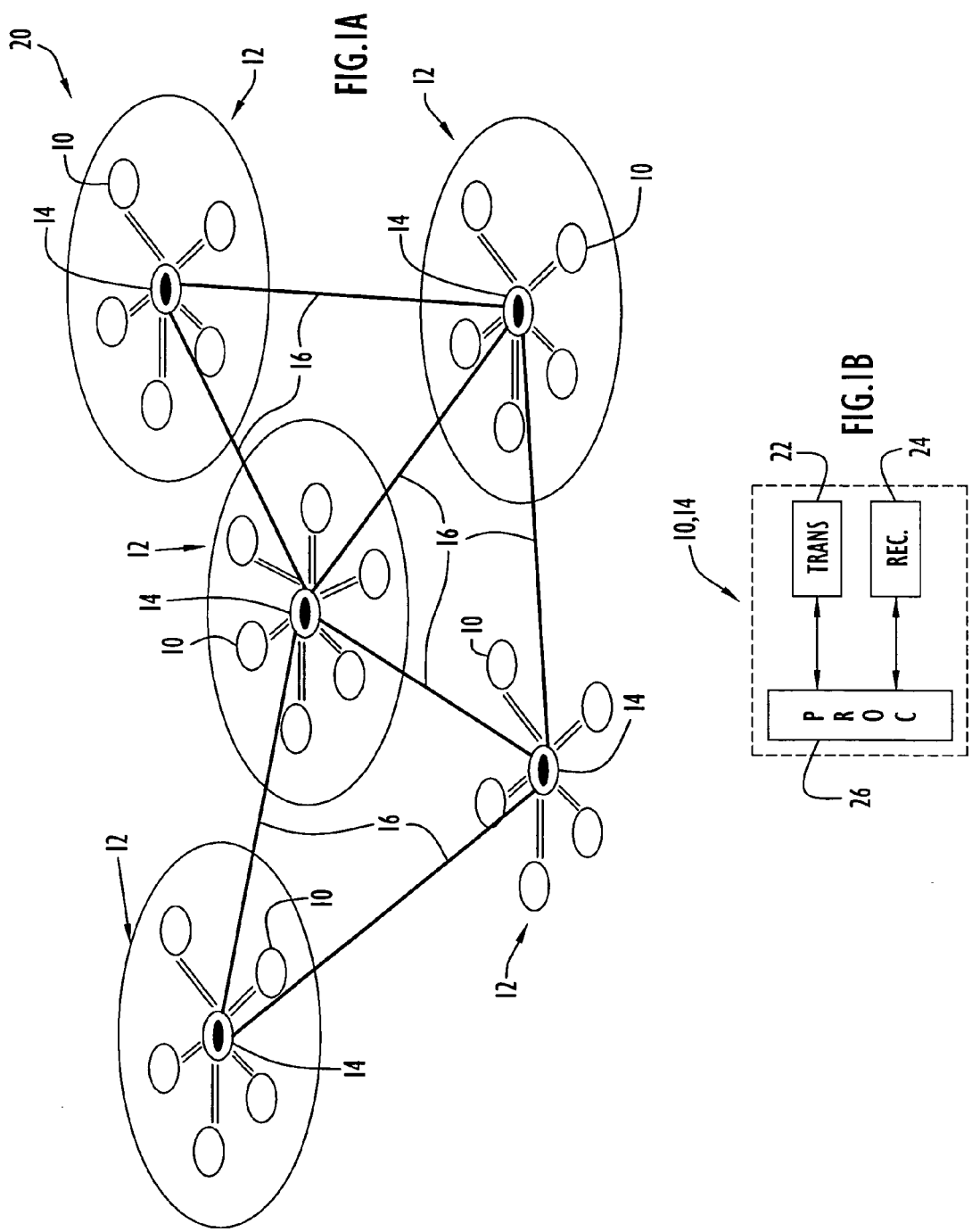
FIG. 1A is a diagrammatic illustration of network nodes arranged in an exemplary communication network and employing a neighbor discovery protocol according to the present invention.
FIG. 1B is a block diagram of a network node of FIG. 1A.

An exemplary wireless Ad-Hoc cluster based network including network nodes according to the present invention is illustrated in FIG. 1A. This type of network does not include a fixed infrastructure (e.g., there is no base station as in a cellular network, where a single-hop environment of a cellular network becomes a special case) and may be utilized in a hostile network environment (e.g., a tactical battlefield, etc.). Specifically, wireless network 20 includes a plurality of nodes 10 arranged in cells or clusters 12. The clusters may be formed based on any conventional or custom cluster formation techniques. Each cell or cluster includes corresponding cluster member nodes 10 with one of those cluster member nodes designated as a cluster head node 14. These cluster arrangements form a first tier of network 20 and facilitate communication within a cluster between the cluster head and member nodes, preferably utilizing a first transmission frequency. The cluster head nodes of each cluster are in communication with each other, preferably utilizing a second transmission frequency, and form a backbone network 16. The backbone network essentially forms a second tier of network 20 and facilitates communications between nodes of different clusters (e.g., generally providing communications over greater distances). The architecture of network 20 is similar to that of conventional cellular telephone systems, except that network 20 provides dynamic selection of cells and cluster head nodes and needs no fixed infrastructure.

The missile and CBT networks can be considered as special cases of the network illustrated in FIG. 1A. The missile network is a flat network and has an architecture similar to the second tier of network 20. The CBT network is a tree network with a core that can be designated as the controller. The CBT architecture also has similarity to the second tier of network 20.

A network node 10 according to the present invention is illustrated in FIG. 1B. Specifically, node 10 includes a transmitter 22, a receiver 24 and a processor 26. The processor is preferably implemented by a conventional microprocessor or controller and controls the node to transmit and receive messages for communications, and to perform the neighbor discovery and flooding protocols described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing. The node further includes an identification (ID) (e.g., a code or identification number) to identify the particular node and a database (not shown) to store information pertaining to neighboring nodes. A cluster head node 14 is substantially similar to node 10 described above, except that the head node can be configured to have two channels. The network node may alternatively be configured for various types of networks (e.g., missile, CBT, etc.).

The network preferably employs a link-state type of routing protocol that is implemented on backbone network 16. The database of each cluster head node 14 maintains information enabling that cluster head to determine appropriate paths for routing messages through the network. The information typically relates to links between the various network head nodes. The cluster head databases are synchronized, in accordance with the routing protocol, by transference of database update packets or messages (e.g., Link-State Advertisements (LSA)) between cluster head nodes that provide network connectivity information. These packets are conventionally transmitted to each neighboring network head node via broadcast or multiple unicast or point-to-point messages (e.g., messages from a source node to a specific destination network node), in response to changes in network topology, an external network connected to network 20 or other modifications to the network facilitating changes in a node database. When a database update packet is received, a point-to-point acknowledgment (ACK) packet may be transmitted to the source node from the destination node to indicate packet reception. In addition, each node (e.g., cluster head and member nodes) periodically broadcasts a neighbor discovery packet. This packet basically advertises the presence of a node within the network and is typically utilized for a "Keep Alive" and neighbor discovery purposes as described below.

With respect to communications between network 20 and other networks, the network may employ a Radio Open Shortest Path First (ROSPF) protocol. This protocol is basically a modified version of the conventional Open Shortest Path First (OSPF) protocol commonly utilized for Internet Protocol (IP) type networks. Since the OSPF protocol generates significant overhead when applied to Ad-Hoc networks (e.g., dynamic wireless networks without any routing infrastructure), such as network 20, that protocol has been modified to derive the ROSPF protocol suitable for use with wireless or radio networks. According to the ROSPF protocol, each node within network 20 maintains a routing database, including information enabling the node to determine an appropriate path for routing a message. The information contained within the node routing databases typically relates to links between the various network nodes. The ROSPF protocol is a link-state type routing protocol and provides for synchronization of node routing databases through transmission of Link-State Advertisement (LSA) packets to each network node. These packets are conventionally transmitted to each neighboring network node via multiple point-to-point messages (e.g., messages from a source node to a specific destination network node) in response to changes in network topology, an external network connected to network 20 or other modifications to the network facilitating changes in a node database. When a database update packet is received, a point-to-point OSPF type acknowledgment (ACK) packet is commonly transmitted to the source node from the destination node to indicate packet reception.

The present invention employs Time Division Multiple Access (TDMA) techniques to perform neighbor discovery (e.g., transmit and receive neighbor discovery messages) and flooding. A single network node is designated as a TDMA controller node to assign TDMA time slots for each of the other network nodes. By way of example only, and referring to the network of FIG. 1A, the network may include N nodes. A portion of the network nodes, $N_1$, are potential controller nodes eligible for designation as the TDMA controller node (e.g., cluster head nodes 14), while the remaining nodes, $N_2$, are member nodes of the network (e.g., member nodes 10), where the total number of network nodes may be expressed as $N=N_1+N_2$. The present invention utilizes one active, or primary, controller node to perform TDMA time slot assignments for each network node. The controller node is further responsible for time slot maintenance due to newly discovered nodes, or nodes removed from the network. When a new node is added to the network, an available time slot is assigned to that node. If a node is lost or removed from the network, the time slot assigned to that node becomes available for use by a subsequent node. A secondary, or backup, controller node is selected to continue the controller node functions in the event the active or primary controller node is disabled. When a secondary controller is promoted to the role of primary controller, it will designate another node to fill the now unoccupied position of secondary controller. The primary and secondary controller nodes are dynamically selected as described below.

The potential controller nodes are ranked based upon the node type, where one type of network node may have preference over other types of network nodes for selection as the controller node. Further, there may be several network nodes of the same type. Accordingly, there generally exists preferential potential controller nodes, $N_3$ (e.g., $N_3 \leq N_1$), available for selection as controller nodes.

Figure 2:
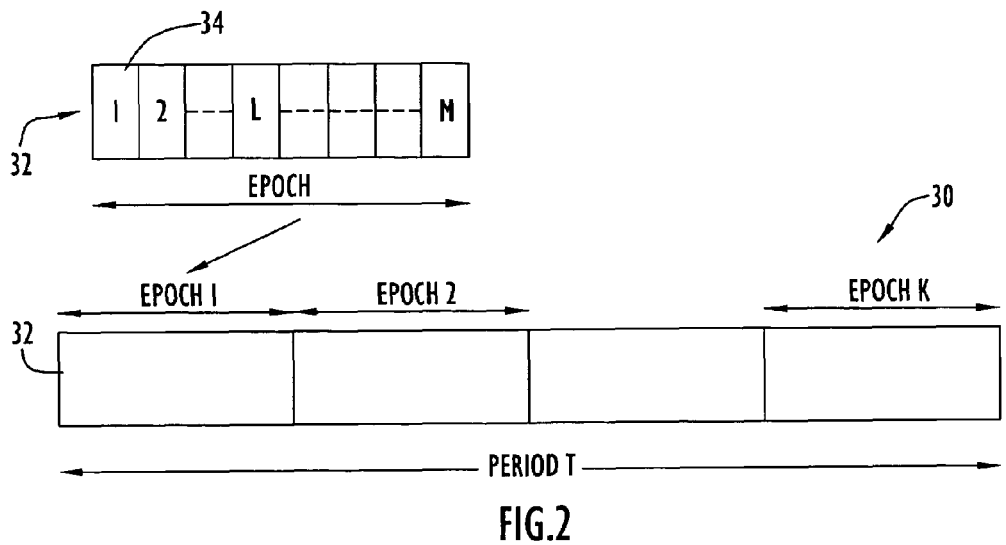
FIG. 2 is a diagrammatic illustration of an exemplary TDMA timing architecture.

The TDMA architecture employed by the present invention is based on several factors, including the channel data rate, image/voice coding rate and the maximum number of hops in the network. The TDMA architecture is further based on the presence of CSMA integrated with TDMA. An exemplary TDMA timing architecture employed by the present invention is illustrated in FIG. 2. Specifically, architecture 30 includes a periodic block of epochs 32. Each architecture period, T, has K epochs 32 with each epoch including M time slots 34. The total number of time slots in a period may be expressed as K*M. By way of example only, the network may include fifty nodes (N=50), an epoch may include thirty-six time slots 34 (e.g., M=36), and endure for ninety milliseconds (ms), with time slots of 2.5 milliseconds (ms). A period, T, may include thirty epochs (e.g., K=30).

Typically, the time slot size and channel rate are selected in a manner that enables each time slot to send data associated with neighbor discovery. Initially, L time slots 34 of each epoch 32 are allocated for neighbor discovery. Each time slot is reserved by one node in the network, where the total number of nodes that can be handled may be expressed as K*L. During each architecture period, each network node transmits in its corresponding assigned time slot. Since only one node transmits in its dedicated time slot, the transmission occurs without collisions.

A few epochs (e.g., depending on the number of hops within the network) occurring toward the end of each period are reserved for performing a Combat Net Radio (CNR) flood as described below. The CNR flood is a technique used to flood data to the entire network using TDMA. This type of flood has several advantages. In particular, the CNR flood does not require routing and provides enhanced reliability due to the use of dedicated TDMA time slots. In addition, the received signal strength during the CNR flood can be stronger than that of the source node due to the possibility of constructive signal superposition as described below.

The quantity of neighbor discovery time slots, L, within each epoch is based on the maximum overhead that can be tolerated in the network. If the maximum overhead is P %, the quantity of neighbor discovery time slots per epoch, L, may be expressed as follows.

$$L=M*P, \quad \text{(Equation 1)}$$

where the L time slots in each epoch are dedicated to neighbor discovery, even if the total number of nodes is less than the product K*L (e.g., the product of the quantity of neighbor discovery time slots, L, and the quantity of epochs, K). The architecture period, T, is further based on the minimum detection time when a node joins or leaves the network. For example, if each epoch endured for a quantity of seconds, E, the maximum detection time, D, may be expressed as follows.

$$D=E*K$$

$$L*K \geq N+F, \quad \text{(Equation 2)}$$

where N is the total number of network nodes and F represents the quantity of time slots dedicated to a CNR flood as described below. The above equations (e.g., Equation 1 and Equation 2) may be utilized to determine L and K that are set initially as system parameters.

Since neighbor discovery, and corresponding maintenance, is a key protocol in an Ad-Hoc network, the present invention employs a TDMA based neighbor discovery protocol to perform these functions. Initially, the network initiates operation without designation of a controller node and without assignment of time slots. During this initial period of time, a periodic-operation-based neighbor discovery protocol is utilized by the present invention. This protocol is based upon CSMA, wherein each node competes for an available channel. Once a controller node is selected and time slots are assigned, the periodic-operation-based protocol is disabled in favor of the TDMA based protocol.

With respect to the periodic-operation-based protocol, each node exchanges neighbor discovery or HELLO packets with neighbors periodically. The time interval, or period, is usually the sum of a fixed constant and some random perturbations in order to reduce collisions. This fixed constant may further be adaptive in accordance with the quantity of neighbors and other factors. When a HELLO packet is received, the transmitting node is added to a neighbor list within the packet. Subsequently, each HELLO packet lists the source node and corresponding neighboring nodes of the source node. A two-way communication is established in response to a receiving node having its own identifier present within the neighbor list of a received HELLO packet.

The neighbor discovery, or HELLO, messages include CSMA HELLO and TDMA HELLO packets. The CSMA HELLO packet is transmitted using a CSMA/CA protocol and is active only during the initial discovery or start-up period of the network. The TDMA HELLO packet is employed by the present invention and is transmitted using TDMA at a specified time slot. The TDMA HELLO and CSMA HELLO packets include a multitude of common parameters, including controller, K and L.

Figure 3A:
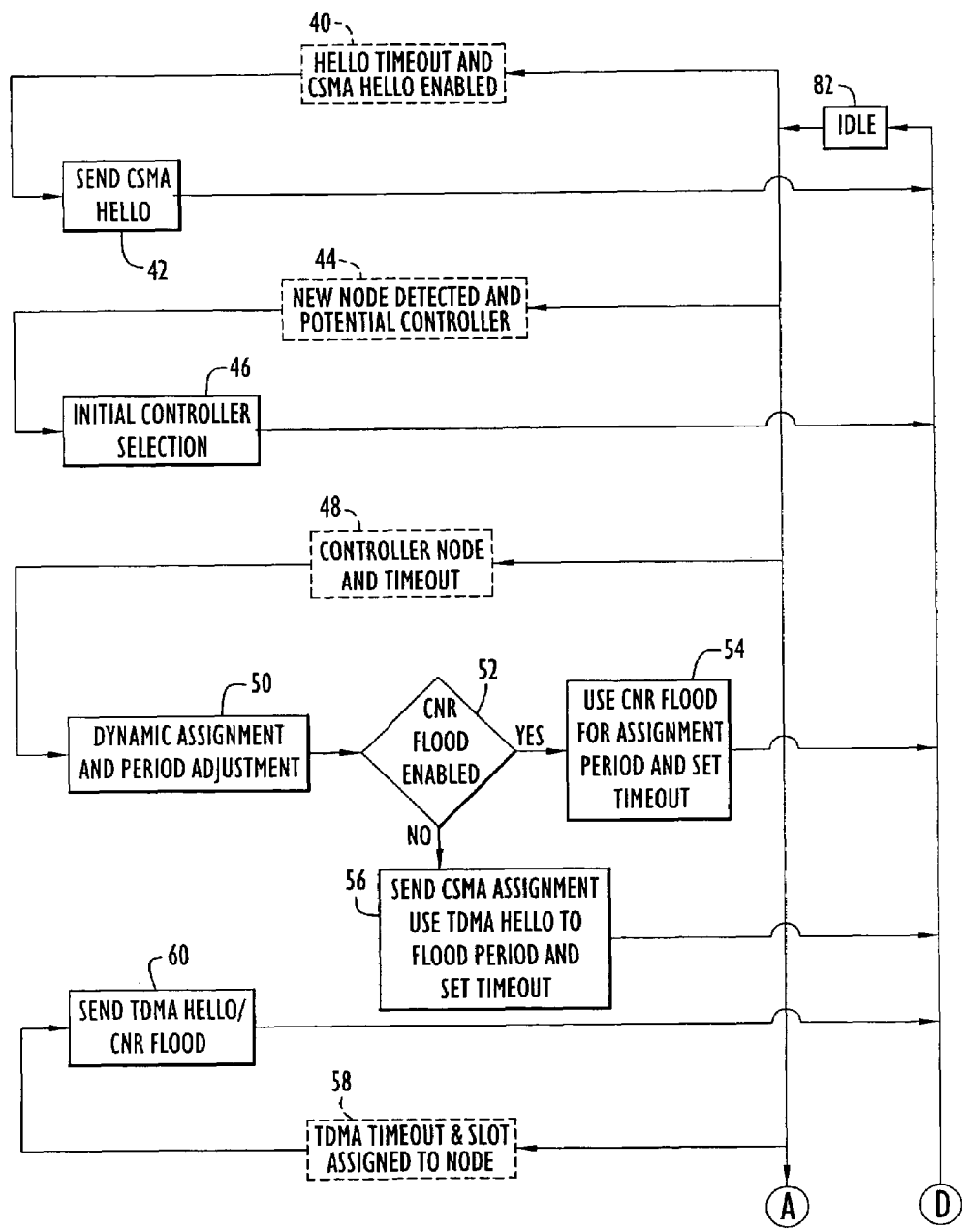
Figure 3B:
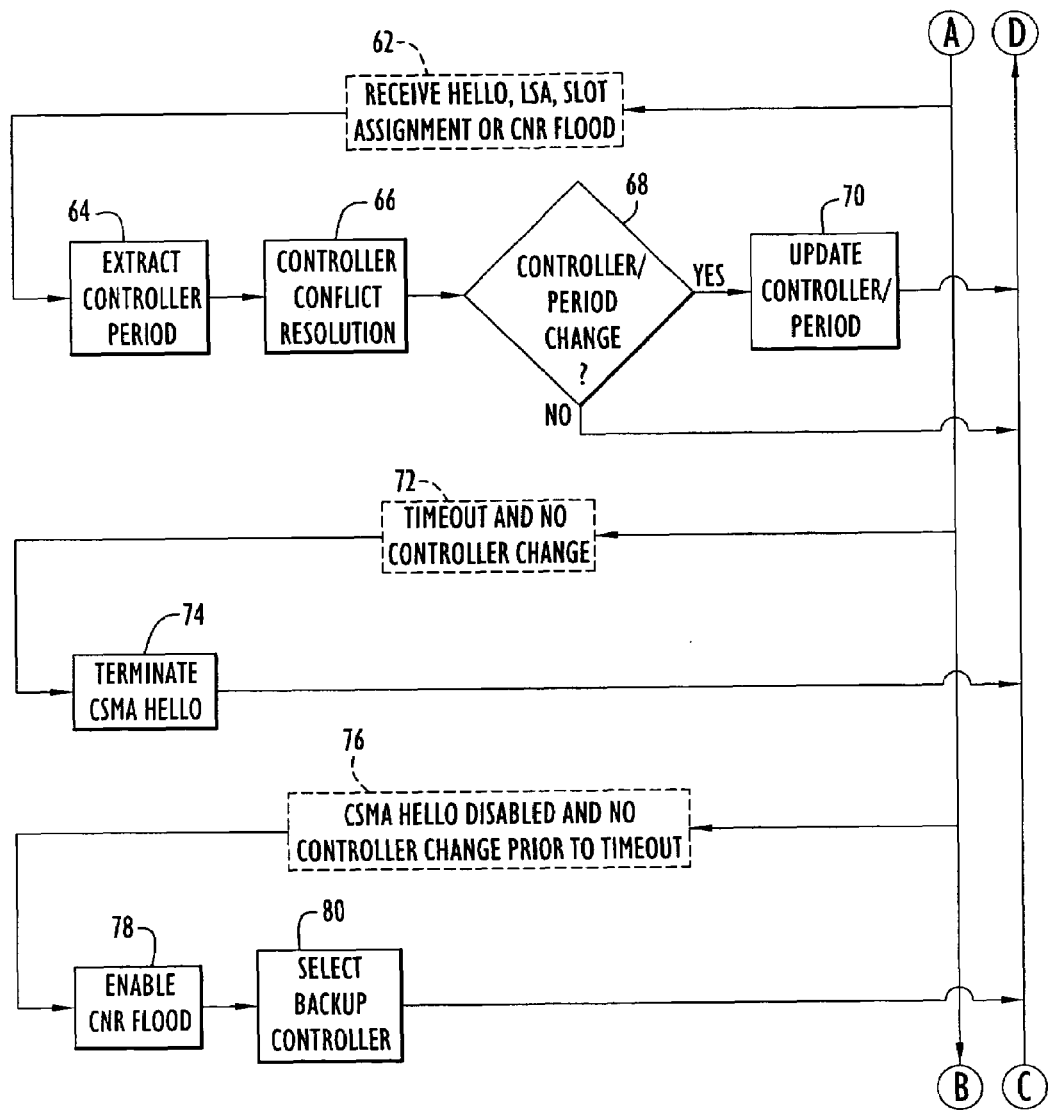

The manner in which the present invention performs neighbor discovery and flooding is illustrated in FIGS. 3A-3C. This is typically accomplished via processor 26 of each node (FIG. 1B). The processor resides in an idle state 82 until occurrence of conditions. When a condition occurs, the processor enters a new state to perform corresponding actions and returns to the idle state as described below. Initially, each node enters the network and may be enabled or powered on at any time. Once a new node enters the network, CSMA HELLO packets are transmitted periodically. Specifically, the node detects expiration of a predetermined transmission interval or condition 40, and transitions from idle state 82 to transmit the CSMA HELLO packet at state 42 in response to enablement of CSMA HELLO packet transmissions (e.g., the CSMA HELLO packets may be disabled in favor of TDMA HELLO packets as described below). The neighbor list and link quality are included in link-state information that is advertised to the other network nodes. The link state information is re-transmitted only in response to network changes, such as a new neighboring node or a lost or removed neighboring node. As long as a node has current link state information pertaining to the other nodes, a Dykstra type algorithm may be applied to determine the shortest routing path for the transmitted packets. Accordingly, rapid detection of a new node, and lost or removed nodes, is essential to the successful operation of an Ad-Hoc network.

A portion of network nodes may be potential controller nodes that are eligible for designation as the TDMA controller node as described above. For example, cluster head nodes 14 (FIG. 1A) are appropriate candidates for designation as a controller node for cluster based network 20. The controller node is responsible for TDMA time slot assignments for transmission of messages, such as TDMA HELLO neighbor discovery packets. The controller node should be selected as early as possible. For maximum efficiency, the time slot assignments should be finished once the network initialization is complete. Although there may be multiple controller nodes initially, the ambiguity can be resolved without causing a problem.

When the node is a potential controller node and detects the presence of a new node or condition 44, the node transitions from idle state 82 to select an initial controller node at state 46. A potential controller node may designate itself as an initial controller node once the node has direct contact with a new node. There are several ways the potential controller node may identify a new node. For example, the potential controller node may examine the neighbor lists from CSMA HELLO packets or CSMA based neighbor discovery. This typically occurs when the new node is a neighbor of the potential controller node. Further, the potential controller node may identify a new node via link state advertisement (LSA). This technique identifies a new node even if the new node is not a neighbor of the potential controller node. Moreover, the potential controller node may identify a new node via TDMA HELLO packet transmissions. This occurs when a new node has been assigned a TDMA time slot and starts transmitting HELLO packets using the assigned TDMA time slot.

Initially, there may be multiple potential controller nodes designating themselves as initial controller nodes. For example, a potential controller node A may consider itself an initial controller node after a new node B is detected. If node B is another potential controller node, node A is not an initial controller node candidate unless node B has a higher node identification (ID). Once a potential controller node becomes an initial controller node, the potential controller node waits for expiration of a controller hold time interval (e.g., expiration of $N_4$ predetermined time intervals or periods) before announcing or designating itself as the controller node. During this wait period, the controller node ambiguity from a node's neighboring potential controller nodes may be resolved. However, the resolution is not guaranteed since nodes are enabled or powered on at random times. Information pertaining to the new controller node is inserted into TDMA HELLO, CSMA HELLO and/or LSA messages for transmission.

When the node is designated as a controller node and detects expiration of the controller hold period or condition 48, the controller node transitions from the idle state to perform time slot assignments and/or adjustment of the TDMA architecture period at state 50. In particular, the controller node assigns time slots and/or adjusts the period (e.g., dynamic time slot assignment) periodically after expiration of each controller hold time interval (e.g., after each expiration of $N_4$ predetermined time intervals or periods). This enables the controller node to accommodate changing network conditions (e.g., new or lost nodes, etc.). The quantity of epochs within the TDMA architecture, K, and quantity of neighbor discovery time slots, L, are initially set as system parameters. The controller node may generally perform a static or dynamic time slot assignment. The static assignment is generally predetermined and fixed, while the dynamic assignment is preferred and performed periodically as described above.

With respect to a static time slot assignment, the parameters K (e.g., quantity of epochs) and L (e.g., quantity of neighbor discovery time slots in a epoch) are determined from the largest possible quantity of nodes in the network, N. The time slot assignment basically starts with the first time slot of the first epoch and continues with the first time slot of subsequent epochs until the first time slot of the final, or $K^{th}$, epoch is reached. The first slot of the first epoch is assigned to the controller node, while the first slot of the remaining epochs are assigned to the other network nodes. The assignment subsequently wraps back to the second time slot of the first epoch and continues with the second slot of subsequent epochs in the manner described above. This process is repeated until each network node is assigned a corresponding one of the L time slots of the epochs. The static assignment includes a fixed period for the TDMA architecture.

The static assignment has several advantages. For example, the static assignment is relatively simple and incurs low overhead, especially if only the first time slot of each epoch is used. However, if the actual number of nodes is smaller than the quantity of time slots available, there may be empty slots. The period may not be reduced to remove the empty slots, since this may remove slots that have already been assigned.

Figure 4:
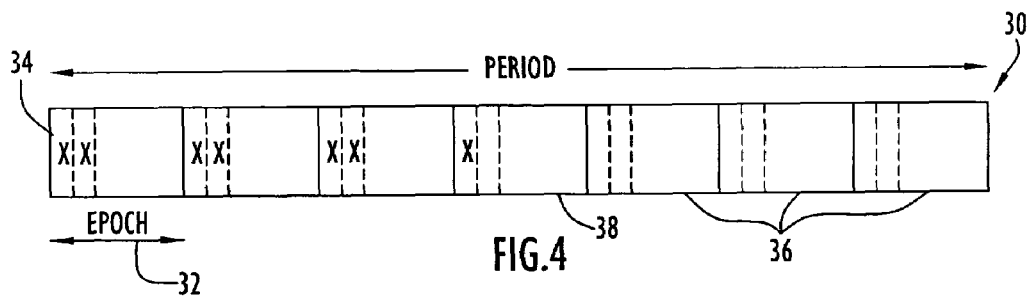
FIG. 4 is a diagrammatic illustration of a TDMA timing architecture accommodating a sufficient quantity of time slots for an application and including exemplary time slot assignments.

The dynamic time slot assignment starts by assigning the L slots of the first epoch to corresponding nodes with the first time slot of the initial epoch dedicated to the controller node. Next, the L slots of the second epoch are assigned to corresponding nodes and the process continues until each network node is assigned one of the L*K time slots (e.g., L time slots of each of K epochs) within the TDMA timing architecture. If the quantity of nodes, N, is less than the quantity of time slots L*K (e.g., N<L*K), then empty slots will exist. The distribution of empty slots will result in a quantity of empty epochs and one epoch with at most L−1 empty neighbor discovery time slots. The period of the architecture may be adjusted to reduce the quantity of empty epochs and/or time slots. Referring to FIG. 4, TDMA timing architecture 30 includes, by way of example only, seven epochs 32 (e.g., K=7) and two assigned neighbor discovery time slots 34 (e.g., L=2) in each epoch. A time slot is illustrated as occupied, or assigned, by the marking 'X' (e.g., as viewed in FIG. 4). There are three empty epochs 36 and one epoch 38 with one (e.g., L−1=1) empty neighbor discovery time slot. The period of architecture 30 may be changed from seven epochs to four epochs (e.g., there can be at most L−1 unused time slots in only one epoch). Preferably, a few empty epochs should be maintained within the architecture to accommodate new nodes. Further, the period is reduced in response to the absence of period changes occurring during a period modification time interval (e.g., at least a quantity, $N_8$, of predetermined time intervals or periods).

Figure 5:
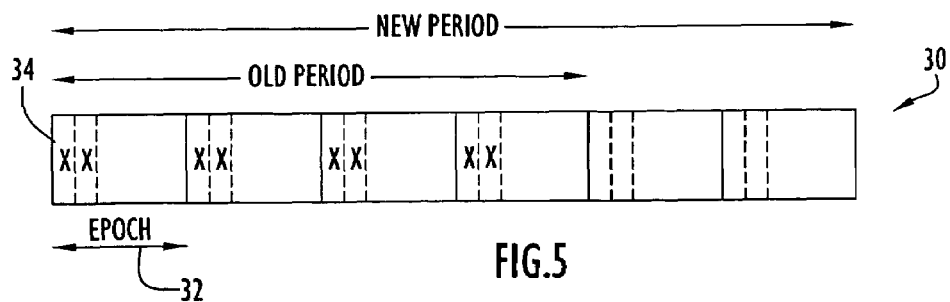
FIG. 5 is a diagrammatic illustration of an exemplary TDMA timing architecture with additional epochs to accommodate an increased quantity of time slots and including exemplary time slot assignments.

If the quantity of nodes, N, is greater than the quantity of time slots within the architecture L*K (e.g., N>L*K), there exists an insufficient amount of time slots to perform an assignment to every node. In this case, the period, T, or quantity of epochs, K, is increased by β epochs. Referring to FIG. 5, TDMA timing architecture 30 initially includes, by way of example only, four epochs 32 (e.g., K=4) and two assigned neighbor discovery time slots 34 (e.g., L=2) in each epoch. A time slot is illustrated as occupied, or assigned, by the marking 'X' (e.g., as viewed in FIG. 5). The architecture is for an exemplary network including ten nodes (e.g., N=10). Since the quantity of nodes, N, is greater than the quantity of available time slots, L*K, in the architecture (e.g., N (10) >L*K (2*4=8)), the period is increased by two epochs to provide an architecture with a period of six epochs (e.g., K=6), thereby providing twelve time slots that can accommodate the ten nodes in the network. An exemplary expression for β that reduces the number of period adjustments is as follows.

$$1 < \beta < N/2 \quad \text{(Equation 3)}$$

The above equation ensures that 13 is greater than one and that the prior period of the architecture accommodates information for a CNR flood described below. If a period does not provide enough time slots to accommodate new nodes, the period is increased immediately.

Figure 6:
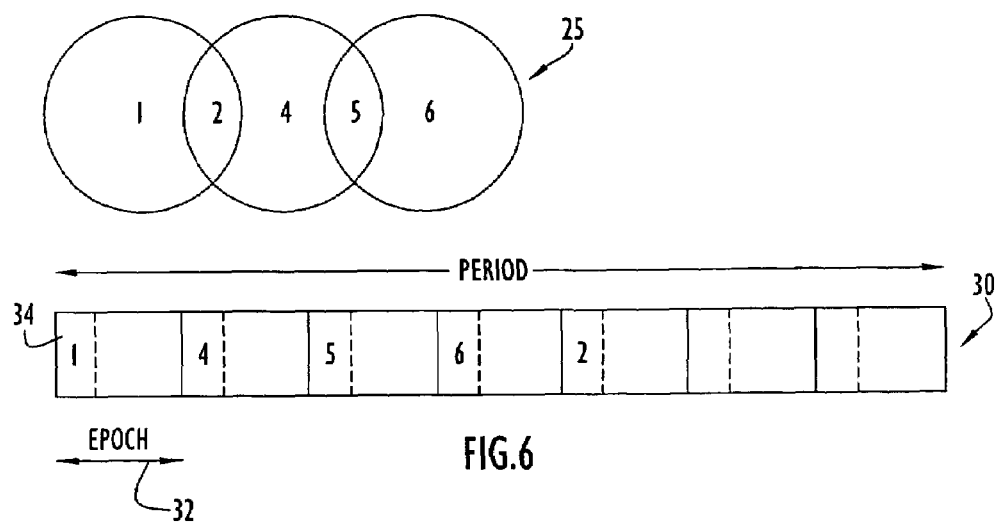
FIG. 6 is a diagrammatic illustration of an exemplary network arrangement and corresponding TDMA timing architecture with time slot assignments for the network.

For flooding mechanism considerations, the controller node assigns time slots based on the number of hops the nodes are away from the controller node. The nodes closer to the controller node are assigned slots closer to the controller node time slot or time slot one. If the one-hop neighbors are assigned slots near the end of a period, more than one period may be required to complete a flood or update as illustrated in FIG. 6. An optimized assignment, based on the hop distances of nodes to the controller node, requires only one period (e.g., K epochs) for each node in the network to receive the flood, or parameter update, from the controller node as illustrated in FIG. 7.

Referring to FIG. 6, a network 25, by way of example only, includes nodes 1, 2, 4, 5 and 6 arranged into three hops. Node 1 is the controller node and is assigned time slot one. Node 2 is a neighbor of node 1 and is assigned toward the end of period T. In a first TDMA period, nodes 4, 5 and 6 cannot receive a packet since node 2 is assigned a time slot subsequent to the time slots of those nodes and has yet to send the packet. In a second period, nodes 4 and 5 receive the packet from node 2, while node 6 receives the packet after transmission by node 5. Therefore, two periods are required to complete the flood.

Figure 7:
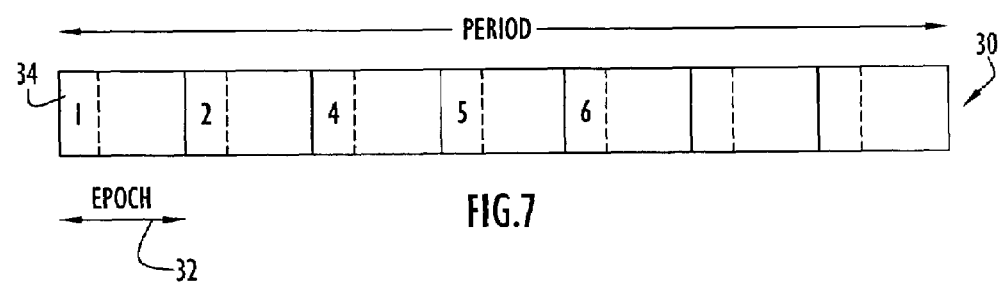
FIG. 7 is a diagrammatic illustration of a TDMA timing architecture with enhanced time slot assignments for the network arrangement of FIG. 6.

An optimal time slot assignment for network 25 is illustrated in FIG. 7. The time slot assignment is based on the number of hops a particular node is from controller node 1. In this case, every node receives the transmitted, or flooded, packet in a single period, since the node time slots are assigned such that nodes closer to the controller transmit earlier. In other words, one period (T) is required to complete the flood to the entire network. The number of hops can be determined from the neighbor table and/or the routing table. The neighbor table is created from the received CSMA and/or TDMA HELLO messages, while the routing table is created from the received LSA messages. If a new node is discovered from the CSMA and/or TDMA HELLO messages, then the number of hops is one. If the new node is discovered only from the LSA messages, then the network has multiple hops. Typically, nodes closer to the controller node are heard faster and the time slot assignments should not be complex. Since the controller node waits for expiration of the controller hold period (e.g., $N_4$ time intervals or periods) before making an assignment as described above, newly detected nodes have better chances of being assigned based on the number of hops.

After an assignment and/or period adjustment is completed, another timer starts for the controller hold time interval and the process continues.

Due to mobility, the positions of the nodes may change, thereby providing a less than optimal time slot assignment. However, the controller node may reassign time slots, if necessary, based on the most recent LSA information. The reassignment is distributed to the network via a CNR flood which is described below.

Referring back to FIG. 3A, if the CNR flood is enabled (e.g., described below with respect to state 78) as determined at state 52, the time slot assignments are distributed using the CNR flood as described below and the controller hold period (e.g., the quantity, $N_4$, of predetermined time intervals) is set at state 54.

When the CNR flood is disabled, the controller node transmits TDMA HELLO packets, or messages, including the controller information and period update, in TDMA time slot one and sets the controller hold period (e.g., the quantity, $N_4$, of predetermined time intervals) at state 56. The time slot assignments are distributed by transmitting a CSMA assignment message to new nodes. A new node transmits an acknowledgment (ACK) to the transmitting controller node in response to accepting that controller node. If the new node refuses to accept the controller node, a negative acknowledgment (NACK) is transmitted to the controller node.

If an acknowledgment is not received from a new node within an acknowledgement time interval, or period, $T_2$, the assignment message is retransmitted for a maximum quantity of times, $N_5$. This parameter may be configurable. The acknowledgement time period, $T_2$, depends upon the number of hops (H) within the network and may be expressed as follows.

$$T_2 = (2+a)*H*T_0, \quad \text{(Equation 4)}$$

where $T_0$ is the one-hop forwarding time and 'a' is a safety factor. $T_0$ is typically one half of the round-trip delay time after receiving a link acknowledgment, while H may be determined from the neighbor table or the link state advertisements (LSA).

When no acknowledgment is received after $N_5$ transmissions and the controller node is not canceled, a congestion condition is declared and the process continues with the parameter 'a' having twice the current value (e.g., a=2*a).

Once a new node accepts the controller node, information pertaining to the newly accepted controller node is included in the TDMA HELLO and/or LSA messages. The new node transmits the TDMA HELLO message in its assigned TDMA time slot, in addition to transmitting a conventional CSMA HELLO message. The CSMA HELLO message is subsequently terminated in favor of the TDMA HELLO message as described below.

If there is a period change in the TDMA architecture, the new period is flooded to the network nodes. In particular, the quantity of neighbor discovery slots, L, the quantity of epochs, K, and controller information are added to the TDMA HELLO and/or LSA message. The controller node broadcasts this HELLO and/or LSA message. Neighboring nodes receiving the HELLO and/or LSA messages update these parameters as described below and broadcast the information using their assigned TDMA slots. If the TDMA slots are not yet assigned, the neighboring nodes transmit CSMA HELLO messages. This mechanism, in effect, floods the updated parameters to all the nodes in the network.

Once time slots are assigned, the TDMA HELLO messages and/or CNR flood are transmitted at periodic time intervals. In particular, when a node detects expiration of a TDMA time interval after assignment of time slots or condition 58, the node transitions from the idle state to perform the appropriate TDMA HELLO message and/or CNR flood at state 60. The TDMA HELLO messages are utilized for neighbor discovery and flooding purposes as described above, while the CNR flood enables flooding of a greater quantity of parameters and is generally utilized for rapid distribution of time slot assignments and controller information.

Further, the TDMA HELLO messages enable detection of lost nodes, or nodes that have moved from or within the network. Since nodes are mobile in a wireless Ad-Hoc network, a node may acquire a new neighbor or lose a prior neighbor. The TDMA HELLO mechanism of the present invention can rapidly detect these events, with minimum overhead transmissions. In addition, the present invention may accommodate a node that may be permanently lost.

Each node sends a TDMA HELLO message in an assigned time slot, thereby avoiding collisions. However, each node can only receive or hear transmissions from neighboring nodes. At the end of each period, the neighboring transmitting nodes can be identified. Detection of a new neighboring node is based on the TDMA HELLO messages. If a new neighboring node is present, the TDMA HELLO message transmitted by that node can be heard within the node's assigned time slot. There is no probability of collision, since the slot assignment is unique. Therefore, in at most one period, this new neighboring node is detected and added to the neighbor table.

When neighboring nodes do not move, their TDMA HELLO message transmissions can be heard every period. If a node moves away beyond a radio propagation range, the TDMA HELLO transmission of that node cannot be received. The lost receptions cannot be due to collisions since the slot assignments are unique. Accordingly, as long as the TDMA HELLO transmission from a neighboring node is not received in one period, that neighbor can be considered lost and removed from the neighbor table. Neighbor tables may be utilized by the controller node to adjust time slot assignments and/or the architecture period as described above.

The network nodes may receive various types of messages, such as CSMA HELLO, TDMA HELLO, LSA, CSMA Slot Assignment, CNR Flood. When a network node detects reception of these types of messages or condition 62 (FIG. 3B), the node transitions from idle state 82 and initially extracts the controller, controller period and associated parameters at state 64. Since there may initially exist more than one controller node within the network as described above, the node, if necessary, selects an appropriate controller node at state 66. In particular, each potential controller node includes a unique identification (ID) that may be used for conflict resolution. When a conflict occurs or, in other words, a node receives messages from different controller nodes, the controller node with the lowest identification is selected. By way of example only, if a node receives two TDMA slot assignments from two different controller nodes, the identifications of these two controller nodes are compared. The controller node with the lowest identification is selected. The node removes the slot assignment from the non-selected controller node and transmits a positive acknowledgment (ACK) to the selected controller node and a negative acknowledgment (NACK) to the non-selected node. After receiving the negative ACK, the non-selected controller node ceases controller functions.

If a controller node receives a slot assignment from another controller node, the identifications of the two controller nodes are compared and the controller node with the lower identification prevails, in substantially the same manner described above. The controller node with the higher identification ceases controller functions.

When a node extracts an advertised controller node from a received message (e.g., TDMA HELLO, CSMA HELLO, LSA or CNR flood) that is different from a prior selected controller node, the controller node identifications (ID) are compared and the controller node with the lower identification prevails in substantially the same manner described above. If the advertised controller node prevails, the node accepts the advertised controller node as the new controller node, removes the time slot assignment from the prior controller node and waits for the assignment (e.g., CSMA assignment or CNR flood message) from the new controller node. When the receiving node is itself a controller node, and the advertised controller node prevails, then the receiving node ceases controller functions and waits for an assignment (e.g., CSMA assignment or CNR flood message) from the new controller node. If the node has already selected a controller node with a lower identification, the selected controller node is maintained by that node.

When the controller node and/or controller period has changed, as determined at state 68, the corresponding parameters for the modification are updated at state 70. In particular, a controller node change may be flooded to the network nodes in various manners including an LSA mechanism, a HELLO message mechanism including TDMA HELLO and CSMA HELLO, and a CNR flood described below. Since the controller identifier is a common parameter included in both the TDMA and CSMA HELLO packets, the controller selection is, in effect, flooded to each node in the network. Thus, only one controller node survives after a few HELLO cycles. However, a selected controller node may also be destroyed or disabled. In this case, a backup, or secondary controller, assumes the controller node functions as described below.

In the event a node receives new controller period parameters pertaining to the quantity of epochs, K, and neighbor discovery time slots, L, the node waits for B time intervals or periods before utilizing the new period. If the new period is received through a CNR flood, the quantity of time intervals, B, is set to one (e.g., B=1). When the new period is received through TDMA HELLO and/or LSA messages, the quantity of time intervals, B, may be expressed as follows.

$$B=H-h,\qquad\text{(Equation 5)}$$

where H is the maximum number of hops in the network and h is the number of hops the particular node is from the controller node.

As described above, CSMA HELLO messages are transmitted during network initialization and may further be transmitted in conjunction with TDMA HELLO messages. However, the present invention disables transmission of CSMA HELLO messages in favor of the TDMA HELLO messages to utilize TDMA for neighbor discovery. Accordingly, if a node does not receive a controller change within a HELLO transition time interval, or period (e.g., a quantity of CSMA HELLO cycles or time intervals, $N_7$) or detects condition 72, the node transitions from the idle state to terminate transmission of CSMA HELLO messages by that node in favor of the TDMA HELLO messages at state 74. Basically, the transmission of CSMA HELLO messages is terminated upon occurrence of the following two conditions: 1) the node has been assigned a time slot from a controller node; and 2) there are no ambiguities or modifications of the controller node selection or controller period for at least a quantity of CSMA HELLO cycles, $N_7$, after receiving a time slot assignment from a controller node. The quantity of CSMA HELLO cycles may be configurable. The first condition ensures a controller node exists and that the local node has been assigned a time slot in which to transmit TDMA HELLO messages. The second condition occurs when no new time slot assignment is received from another controller node and the received message (e.g., TDMA HELLO, LSA, CSMA HELLO) does not reveal another controller node. The parameter pertaining to the quantity of CSMA HELLO cycles, $N_7$, is preferably set to be twice the maximum number of hops in the network in order to provide sufficient time to ensure that TDMA HELLO and/or LSA messages may be received from any promoted controller node. If the above conditions occur, the transmission of CSMA HELLO messages is disabled and the only HELLO transmission from the node is through its assigned TDMA slots.

When CSMA HELLO messages are disabled and no changes in the controller node have occurred during a CNR enable interval (e.g., a quantity of predetermined time intervals or periods, $N_9$) or the node detects condition 76, the node transitions from the idle state to enable CNR flood at state 78. The CNR flood is realized using the principle of a conventional RAKE receiver to remove multi-path interference from a desired signal. The transmitted signal is modulated using a pseudonoise sequence. If the phase difference between the multi-path signal and the desired signal is sufficiently low, the multi-path and desired signals are combined constructively. Otherwise, the multi-path signal is removed. The same principle can be applied to simultaneous transmissions from multiple sources when the data transmitted from each source is the same. In other words, the transmitted signals add constructively if the received phases of these signals are within a tolerable limit.

The CNR flood is performed by the controller node. By way of example only, a controller node intends to flood data to each node in the network. The controller node broadcasts in the corresponding assigned time slot. After receiving the transmissions, each one-hop neighbor broadcasts in corresponding assigned time slots. These broadcasts from the neighbors do not have collisions. Rather, some or all of the transmissions add constructively to increase the signal strength. Each of the nodes receiving the broadcasts from the one-hop neighbors broadcasts the transmission as described above. This process continues until each node in the network receives the data.

Figure 8:
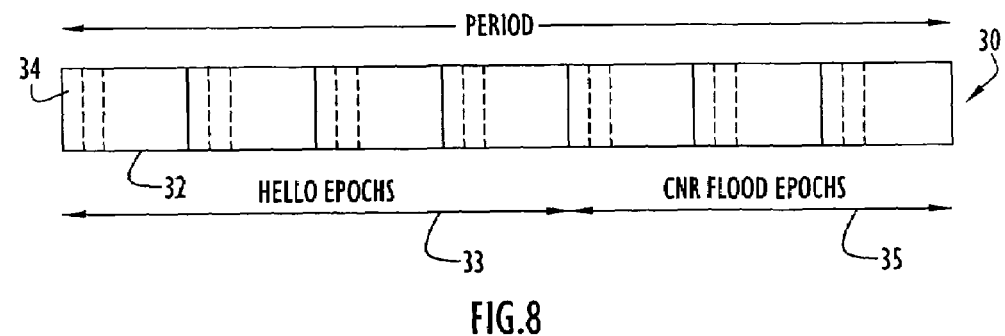
FIG. 8 is a diagrammatic illustration of a TDMA timing architecture including HELLO and CNR flood epochs.

An exemplary TDMA architecture including HELLO and CNR flood epochs is illustrated in FIG. 8. By way of example only, architecture 30 includes seven epochs 32. Four epochs correspond to HELLO epochs 33, while three epochs correspond to CNR flood epochs 35. Each of the epochs includes time slots 34 as described above. Architecture 30 illustrates the manner in which six hops can be supported for a CNR flood (e.g., two time slots 34 within each of three CNR flood epochs 35). CNR flood epochs 35 are typically placed at the end of a period. If no empty epochs are available for a CNR flood, the period is increased by adding some additional epochs. The required number of epochs can be estimated from the maximum number of hops, H, in the network. For example, if all of the flooded data can be fit within a single time slot, then the number of required slots, F, and the number of epochs, G, may be expressed as follows.

$$F = H + \gamma \quad \text{(Equation 6)}$$

$$G = (H+\gamma)/L, \quad \text{(Equation 7)}$$

where the parameter, $\gamma$, is a safety factor and L is the quantity of neighbor discovery time slots described above.

The controller node has a record of the TDMA time slot reservations for each node in the network. This record is updated each time a new node is assigned a time slot. The CNR flood is activated when CSMA HELLO messages are disabled and there have been no period or controller changes for at least $N_9$ time intervals or periods after disabling the CSMA HELLO messages, as described above. If the CNR flood is activated, TDMA time slot reservations are transmitted from the controller node using the CNR flood each TDMA time interval, or period, as described above for state 60 (FIG. 3A). In addition, the controller selection, backup or secondary controller, controller period and quantity of epochs, K, are included in the CNR flood message. However, once complete time slot reservations, or assignments, have been transmitted, only changes to those reservations are transmitted in future periods.

A new potential controller node with the lowest identification (ID) may enter the network after network settlement. However, the potential controller node can announce itself as a new controller node only after $N_4$ time intervals, or periods, as described above. If a CNR flood is received during this wait time, the potential controller node includes the TDMA time slot assignments from the prior controller node and the new controller node information is flooded to the network nodes through the LSA mechanism. The new controller node assumes the controller functions after $N_4$ HELLO cycles have expired. This guarantees that the prior controller node has been demoted to prevent the new and prior controller nodes from transmitting a CNR flood at the same time, thereby causing collisions. During the $N_4$ HELLO cycles, the prior controller is still responsible for the controller functions.

The controller node can flood the time slot assignments of the entire network in one period. Therefore, once the CNR flood is activated, the transmission of a slot assignment message using CSMA/CA is terminated.

Referring back to FIG. 3B, once the CNR flood is enabled, a backup or secondary controller node is selected at state 80. A backup controller node is selected in case the active, or primary, controller node stops functioning (e.g., due to enemy action, mechanical failure, etc.). The backup controller node assumes the functions of the primary controller node in response to a primary controller node failure. In particular, the remaining potential controller nodes (e.g., $N_1$–1 nodes, excluding the controller node) are eligible for designation as the backup, or secondary, controller. These nodes are ranked based upon their node types. Basically, the selection of a node as a backup controller is based on connectivity to the network and node identification. A candidate without connectivity to the network is excluded from consideration as a backup controller. The node with the lowest identification (ID), within the nodes having connectivity to the network, is designated as the backup controller. The controller node subsequently indicates the identity of the backup controller selection in the CNR flood message. Initially, only the controller node has the TDMA slot reservations of all the nodes in the network. In order to distribute slot reservations to potential backup controllers, the CNR flood is employed. The TDMA HELLO flood and CNR flood are both collision free. However, the TDMA HELLO flood is generally used for the case in which only a few parameters need to be updated. If a large number of parameters need to be distributed, the preferred technique is the CNR flood.

A potential controller node, receiving a CNR flood, extracts the backup controller from the message, if present. When the identification (ID) of the receiving potential controller node matches the identification (ID) of the backup controller in the message, the potential controller node becomes the backup controller.

If the node is a potential controller node and detects a primary controller failure or condition 86 (FIG. 3C), the node transitions from the idle state and looks for the existence of a backup controller at state 88. When a backup controller exists, the backup controller assumes the primary controller functions and uses the CNR flood to distribute the time slot assignments at state 90, in the manner described above. The failure of the primary controller node can be detected by the potential controller node based on the following occurring in a controller transition time interval, or period: 1) there are no receptions of TDMA HELLO messages in slot one; and 2) there are no receptions of CNR flood messages. The first condition cannot guarantee the loss of a controller node since this may be due to collisions of multiple contending controller nodes among the neighbors. However, this typically happens during the discovery period and may occur when the potential controller node moves beyond the radio range of the primary controller node. Therefore, the combination of the above conditions guarantees an accurate detection of the loss, or failure, of the controller node.

If the potential controller node is already selected as the backup controller by the prior or failed controller node, the backup controller becomes the new controller node. The backup controller knows the TDMA HELLO reservations of each existing node, since this information was previously flooded by the failed controller using the CNR flood. The backup controller node, which has now been promoted to primary controller, transmits using time slot one, while the corresponding time slot that was previously used by the backup controller node is now available for future assignment.

The backup controller floods the time slot reservations using a CNR flood. Each node receiving the data from the new controller node abandons the current time slot and uses the new time slot from the new controller node.

The controller node may be disabled prior to enablement of the CNR flood to broadcast TDMA time slot reservations and prior to backup controller selection. This typically occurs during network initialization. If a backup controller does not exist as determined at state 88, each of the remaining potential controller nodes (e.g., excluding the failed controller node) detecting a controller node failure starts an independent procedure to select a controller node at state 92. If a node is the new controller as determined at state 94, the node broadcasts the new controller information (e.g., controller, period, etc.) via TDMA HELLO, CSMA HELLO and/or LSA messages at state 96. Each node receiving this new controller broadcast continues using prior assigned time slots, unless a new assignment is received from the new controller node. The new controller node knows the current network nodes based on the information within previously received CSMA HELLO, TDMA HELLO and/or LSA messages. If the CNR flood is enabled, the TDMA HELLO slot assignments are transmitted via a CNR flood. Otherwise, a CSMA assignment message is transmitted. The nodes continually check for the various conditions and/or expiration of time intervals, and perform the associated functions described above based on the state of the nodes and network, and/or node conditions.

It will be appreciated that the embodiments described above and illustrated in the drawings represent only a few of the many ways of implementing a method and apparatus for dynamic neighbor discovery within wireless networks using time division multiple access (TDMA).

The communication networks employing the present invention nodes may include any quantity of those nodes and may be of any type of network (e.g., missile, cluster based, CBT, Ad-Hoc wireless, etc.). The network nodes may be arranged in any fashion into any quantity of clusters each having any quantity of nodes. The backbone network may include any quantity of cluster head nodes, while communications within a cluster and between neighboring cluster head nodes of the backbone network may utilize the same or different transmission frequencies. The formation of clusters and designation of cluster head nodes may be predetermined or accomplished dynamically via any conventional or other algorithm or technique. The nodes may communicate via any suitable communications medium (e.g., wired or wireless communication devices, etc.).

The present invention node may include any quantity of conventional or other transmitters and/or transceivers, where each transmitter or transceiver may transmit signals at any suitable frequency and in any suitable energy form (e.g., radio signals, microwave, optical signals, etc.), and any quantity of conventional or other receivers and/or transceivers, where each receiver or transceiver may receive signals at any suitable frequency and in any suitable energy form (e.g., radio signals, microwave, optical signals, etc.). The present invention node may include any quantity of independent transmitting and/or receiving devices, may utilize any quantity of frequency channels of any desired frequencies and may send voice and/or data. The present invention node may employ any conventional access scheme or protocol to initially access and/or transmit information. Alternatively, the node may utilize TDMA based neighbor discovery at start-up in response to a pre-arranged slot assignment. The present invention node may further include any quantity of any types of input or control devices (e.g., buttons, switches, etc.) to control node operation. The node may be in the form of any type of radio unit or other communications device. The present invention node may include any type of identification including any quantity of any type of symbols or characters (e.g., numeric, alphabetic, alphanumeric, etc.), preferably including a predetermined hierarchy or order.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of hardware and/or software modules, processors or other processing devices or circuits. The software for the processor of the present invention node may be implemented in any suitable computer language, and could be developed by one of ordinary skill in the computer and/or programming arts based on the functional description contained herein and the state diagram illustrated in the drawings. Further, any references herein of software performing various functions generally refer to processors performing those functions under software control. The software and/or algorithms described above and illustrated in the state diagram may be modified in any manner that accomplishes the functions described herein. The present invention node may alternatively include any components arranged in any fashion to facilitate neighbor discovery and flooding in the manner described above.

The packets or messages transmitted by the network (e.g., TDMA HELLO, CSMA HELLO, LSA, assignment, acknowledgement, CNR flood, etc.) may be of any size, may have any format and may contain any desired information. The packets may be transmitted at any suitable transmission rate or have any desired interval between transmissions. The various messages or packets may include any identifier to identify the type of message or packet. The packets may be broadcasted or transmitted any quantity of times.

The TDMA architectures may be of any quantity and include any quantity of any types of epochs (e.g., flood, HELLO, etc.) with any quantity of any types of time slots (e.g., neighbor discovery, etc.). The architecture may include any desired period, where the time slots and epochs may include any desired durations. The slots may be reserved or assigned in any manner (e.g., static, dynamic, central, distributive, etc.) based on any desired conditions (e.g., hop distances, etc.), where the architecture (e.g., epochs, time slots, etc.) may be arranged in any fashion. The assignment may assign any time slots from any epochs to corresponding nodes in any desired order. The architecture may include any quantity of neighbor discovery or other slots (e.g., reserved for specific purposes, for a particular application, etc.) arranged in any fashion. The present invention and/or architecture may be structured to be compatible with any network or transmission scheme (e.g., time division multiplexing, TDMA, etc.).

The controller, period and other information may be embedded or piggybacked within any suitable packet (e.g., database update, neighbor discovery, CNR flood, etc.). Alternatively, this information may be transmitted in respective packets or messages of any quantity. The database update and neighbor discovery packets may be transmitted at any desired intervals and/or in response to any desired events or conditions. The node database may be implemented by any conventional database or other storage structure (e.g., processor memory, external memory, file, data structure (e.g., array, queue, stack, etc.), etc.) and may have any desired storage capacity to contain any desired information.

The primary and secondary controller nodes may be selected based on any desired criteria (e.g., highest identification, lowest identification, random, first to designate itself as a controller, etc.). The primary and secondary controllers may be selected from any desired group of nodes (e.g., member nodes, control nodes, etc.). The controller functions may be distributed among any quantity of nodes. In other words, the networks may include any quantity of primary and secondary controller nodes. The various time intervals or periods (e.g., controller hold, period modification, acknowledgement, CNR enable, controller transition period, TDMA period, CSMA HELLO interval, HELLO transition interval, etc.) may be set to any desired intervals suitable for performing the functions described above. The nodes may utilize any type of handshaking or message exchange to accept or reject a controller (e.g., implied or express acknowledgements or negative acknowledgements, etc.).

The time slot assignments may be transmitted in any desired manner (e.g., flooding, embedded within neighbor discovery or other messages, assignment messages, etc.), where any quantity of retransmissions may be transmitted in a transmission time period. The TDMA messages (e.g., HELLO, CNR flood, etc.) may include any desired information in any desired time slots. The assignments may be transmitted at each interval or, alternatively, modifications to the slot assignments may be subsequently transmitted once a full assignment has been transmitted. The timing architecture period may be adjusted in any manner in accordance with network or other conditions. For example, a desired number of epochs may be removed or added to accommodate a quantity of nodes in a network.

The present invention may utilize any conventional protocol at network initialization for neighbor discovery (e.g., CSMA, etc.) until time slots can be assigned. Further, a controller node failure may be detected based on any desired conditions (e.g., lack of neighbor discovery or other messages, etc.). Further, the termination of the initial protocol (e.g., slot assignment, HELLO and other messages) may be based on any desired node and/or network conditions (e.g., selection of a controller, controller stability, etc.). The various variables described above (e.g., T, N, etc.) are preferably integers; however, the variables may be of any type of numbers (e.g., real, integer, etc.). The CNR flood may be accomplished based on any types of transmissions enabling superposition of signals and/or removal of multi-path interference.

It is to be understood that the present invention is not limited to the applications or networks described herein, but may be utilized for various communication applications or networks, especially wireless Ad-Hoc radio networks.

From the foregoing description, it will be appreciated that the invention makes available a novel method and apparatus for dynamic neighbor discovery within wireless networks using time division multiple access (TDMA), wherein each node within a multi-hop wireless Ad-Hoc network is assigned a unique time slot to broadcast neighbor discovery (e.g., HELLO) messages.

Having described preferred embodiments of a new and improved method and apparatus for dynamic neighbor discovery within wireless networks using time division multiple access (TDMA), it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A communication unit to transmit and receive information within a communications network and to discover neighboring communication units comprising:
 a transmitter to transmit outgoing information to at least one other communication unit within said network;
 a receiver to receive incoming information from at least one other communication unit within said network; and
 a processor to control said transmission and reception of said outgoing and incoming information, wherein said processor includes:
  a neighbor discovery module to transmit neighbor discovery messages to neighboring communication units in accordance with a time division multiplexing communication scheme and a second different communication scheme, wherein neighbor discovery messages are transmitted within an assigned time slot in said time division multiplexing communication scheme to indicate the presence of said communication unit within said network; and
  a controller module to assign and maintain said communication scheme time slots for said communication units within said network in response to said communication unit being selected as a primary controller.

2. The unit of claim 1, wherein said time division multiplexing communication scheme includes time division multiple access (TDMA).

3. The unit of claim 1, wherein said transmitter transmits said outgoing information in the form of radio signals.

4. The unit of claim 1, wherein said receiver receives said incoming information in the form of radio signals.

5. The unit of claim 1, wherein said processor further includes:
 an initial discovery module to transmit neighbor discovery messages in accordance with said second communication scheme different from said time division multiplexing scheme to indicate the presence of said communication unit within said network.

6. The unit of claim 5, wherein said second communication scheme includes Carrier Sense Multiple Access (CSMA).

7. The unit of claim 1, wherein said processor further includes:
a primary controller selection module to dynamically select a communication unit within said network to serve as said primary controller.

8. The unit of claim 7, wherein each said communication unit within said network includes an identification and said primary controller selection module includes an identification module to compare identifications of communication units and select said primary controller based on said comparison.

9. The unit of claim 7, wherein said processor further includes:
a secondary controller selection module to dynamically select a communication unit within said network to serve as a secondary controller to assign and maintain said communication scheme time slots for said communication units within said network in response to disablement of said primary controller.

10. The unit of claim 9, wherein said secondary controller selection module includes an identification module to compare identifications of communication units and select said secondary controller based on said comparison and connectivity of communication units to said network.

11. The unit of claim 5, wherein said processor further includes:
a discovery termination module to terminate utilization of said second communication scheme for neighbor discovery in favor of said time division multiplexing communication scheme.

12. The unit of claim 11, wherein said discovery termination module includes a condition module to terminate utilization of said second communication scheme in response to selection of a controller to assign and maintain said communication scheme time slots and the absence of a change in said controller within a predetermined time interval.

13. The unit of claim 1, wherein said controller module includes a static assignment module to assign said time slots in a static fashion to said communication units.

14. The unit of claim 1, wherein said controller module includes a dynamic assignment module to assign said time slots and adjust a period of said time division multiplexing communication scheme in a dynamic fashion.

15. The unit of claim 14, wherein said dynamic assignment module includes a time slot module to assign time slots to each communication unit based on a hop distance between that communication unit and said primary controller.

16. The unit of claim 14, wherein said time division multiplexing communication scheme includes a time division multiplexing architecture including a plurality of epochs each with a series of time slots, and said dynamic assignment module includes a period adjustment module to dynamically adjust said quantity of epochs within said architecture to accommodate said communication units within said network.

17. The unit of claim 1, wherein said controller module includes a flood module to transmit said time slot assignments to said communication units, wherein said time slot assignments are transmitted to enable constructive superposition to remove multi-path interference and enhance signal strength.

18. The unit of claim 1, wherein said neighbor discovery module includes:
a neighbor detect module to detect the presence of a new neighboring communication unit in response to receiving a neighbor discovery message in a corresponding time slot assigned to that neighboring communication unit; and
a lost neighbor module to detect the absence of a neighboring communication unit in response to a lack of reception of said neighbor discovery message in a corresponding time slot assigned to that neighboring communication unit.

19. A method of transferring information between a communication unit and other units within a communications network and discovering neighboring communication units comprising:
(a) transmitting neighbor discovery messages from said communication unit to neighboring communication units in accordance with a time division multiplexing communication scheme and a second different communication scheme, wherein neighbor discovery messages are transmitted within an assigned time slot in said time division multiplexing communication scheme to indicate the presence of said communication unit within said network; and
(b) assigning and maintaining said communication scheme time slots for said communication units within said network in response to said communication unit being selected as a primary controller.

20. The method of claim 19, wherein said time division multiplexing communication scheme includes time division multiple access (TDMA).

21. The method of claim 20, wherein said neighbor discovery messages are transmitted in the form of radio signals.

22. The method of claim 19, wherein step (a) further includes:
(a.1) transmitting initial neighbor discovery messages from said communication unit in accordance with said second communication scheme different from said time division multiplexing scheme to indicate the presence of said communication unit within said network.

23. The method of claim 22, wherein said second communication scheme includes Carrier Sense Multiple Access (CSMA).

24. The method of claim 19, wherein step (a) further includes:
(a.1) dynamically selecting a communication unit within said network to serve as said primary controller.

25. The method of claim 24, wherein each said communication unit within said network includes an identification, and step (a.1) further includes:
(a.1.1) comparing identifications of communication units and selecting said primary controller based on said comparison.

26. The method of claim 24, wherein step (a) further includes:
(a.2) dynamically selecting a communication unit within said network to serve as secondary controller to assign and maintain said communication scheme time slots for said communication units within said network in response to disablement of said primary controller.

27. The method of claim 26, wherein step (a.2) further includes:
(a.2.1) comparing identifications of communication units and selecting said secondary controller based on said comparison and connectivity of communication units to said network.

28. The method of claim 22, wherein step (a) further includes:
   (a.2) terminating utilization of said second communication scheme for neighbor discovery in favor of said time division multiplexing communication scheme.

29. The method of claim 28, wherein step (a.2) further includes:
   (a.2.1) terminating utilization of said second communication scheme in response to selection of a controller to assign and maintain said communication scheme time slots and the absence of a change in said controller within a predetermined time interval.

30. The method of claim 19, wherein step (b) further includes:
   (b.1) assigning said time slots in a static fashion to said communication units.

31. The method of claim 19, wherein step (b) further includes:
   (b.1) assigning said time slots and adjusting a period of said time division multiplexing communication scheme in a dynamic fashion.

32. The method of claim 31, wherein step (b.1.1) further includes:
   (b.1.1) assigning time slots to each communication unit based on a hop distance between that communication unit and said primary controller.

33. The method of claim 31, wherein said time division multiplexing communication scheme includes a time division multiplexing architecture including a plurality of epochs each with a series of time slots, and step (b.1) further includes:
   (b.1.1) dynamically adjusting said quantity of epochs within said architecture to accommodate said communication units within said network.

34. The method of claim 19, wherein step (b) further includes:
   (b.1) transmitting said time slot assignments to said communication units, wherein said time slot assignments are transmitted to enable constructive superposition to remove multi-path interference and enhance signal strength.

35. The method of claim 19, wherein step (a) further includes:
   (a.1) detecting the presence of a new neighboring communication unit in response to receiving a neighbor discovery message in a corresponding time slot assigned to that neighboring communication unit; and
   (a.2) detecting the absence of a neighboring communication unit in response to a lack of reception of said neighbor discovery message in a corresponding time slot assigned to that neighboring communication unit.

36. A communications network comprising:
   a plurality of communication units for transferring information therebetween, wherein neighbor discovery messages are transmitted from said communication units to neighboring communication units in accordance with a time division multiplexing communication scheme and a second different communication scheme, wherein neighbor discovery messages are transmitted within assigned time slots in said time division multiplexing communication scheme to indicate the presence of said communication units within said network, and wherein one of said communication units is designated as a primary controller to assign and maintain said communication scheme time slots for said communication units within said network.

37. The network of claim 36, wherein said time division multiplexing communication scheme includes time division multiple access (TDMA).

38. The network of claim 36, wherein initial neighbor discovery messages are transmitted from said communication units in accordance with said second communication scheme different from said time division multiplexing scheme to indicate the presence of said communication units within said network.

39. The network of claim 38, wherein said second communication scheme includes Carrier Sense Multiple Access (CSMA).

40. The network of claim 36, wherein said communication units dynamically select a communication unit within said network to serve as said primary.

41. The network of claim 40, wherein said communication units dynamically select a communication unit within said network to serve as a secondary controller to assign and maintain said communication scheme time slots for said communication units within said network in response to disablement of said primary controller.

42. The network of claim 38, wherein said communication units terminate utilization of said second communication scheme for neighbor discovery in favor of said time division multiplexing communication scheme.

43. The network of claim 40, wherein said primary controller assigns said time slots and adjusts a period of said time division multiplexing communication scheme in a dynamic fashion.

44. The network of claim 36, wherein said communication units detect the presence of a new neighboring communication unit in response to receiving a neighbor discovery message in a corresponding time slot assigned to that neighboring communication unit, and wherein said communication units detect the absence of a neighboring communication unit in response to a lack of reception of said neighbor discovery message in a corresponding time slot assigned to that neighboring communication unit.

45. A method of transferring information between communication units within a communications network and discovering neighboring communication units comprising:
   (a) transmitting neighbor discovery messages from said communication units to neighboring communication units in accordance with a time division multiplexing communication scheme and a second different communication scheme, wherein neighbor discovery messages are transmitted within assigned time slots in said time division multiplexing communication scheme to indicate the presence of said communication units within said network; and
   (b) assigning and maintaining said communication scheme time slots for said communication units within said network via one of said communication units designated as a primary controller.

46. The method of claim 45, wherein said time division multiplexing communication scheme includes time division multiple access (TDMA).

47. The method of claim 45, wherein step (a) further includes:
   (a.1) transmitting initial neighbor discovery messages from said communication units in accordance with said second communication scheme different from said time division multiplexing scheme to indicate the presence of said communication units within said network.

48. The method of claim 47, wherein said second communication scheme includes Carrier Sense Multiple Access (CSMA).

49. The method of claim 45, wherein step (a) further includes:
   (a.1) dynamically selecting a communication unit within said network to serve as said primary controller.

50. The method of claim 49, wherein step (a) further includes:
   (a.2) dynamically selecting a communication unit within said network to serve as a secondary controller to assign and maintain said communication scheme time slots for said communication units within said network in response to disablement of said primary controller.

51. The method of claim 47, wherein step (a) further includes:
   (a.2) terminating utilization of said second communication scheme for neighbor discovery in favor of said time division multiplexing communication scheme.

52. The method of claim 49, wherein step (a) further includes:
   (a.2) assigning said time slots and adjusting a period of said time division multiplexing communication scheme in a dynamic fashion via said primary controller.

53. The method of claim 45, wherein step (a) further includes:
   (a.1) detecting the presence of a new neighboring communication unit in response to receiving a neighbor discovery messge in a corresponding time slot assigned to that neighboring communication unit; and
   (a.2) detecting the absence of a neighboring communication unit in response to a lack of reception of said neighbor discovery message in a corresponding time slot assigned to that neighboring communication unit.

* * * * *

UNITED STATES PATENT AND TRADEMARK OFFICE
CERTIFICATE OF CORRECTION

PATENT NO.          : 7,502,360 B2
APPLICATION NO.     : 11/071235
DATED               : March 10, 2009
INVENTOR(S)         : Yu-Jih Liu et al.

Page 1 of 1

It is certified that error appears in the above-identified patent and that said Letters Patent is hereby corrected as shown below:

Column 26, line 10, replace "messge in a" with -- message in a --.

Signed and Sealed this

Twelfth Day of May, 2009

JOHN DOLL
*Acting Director of the United States Patent and Trademark Office*